INVENTOR
Abraham Podel.
BY
ATTORNEYS

INVENTOR
Abraham Podel.
BY
ATTORNEYS

June 10, 1947.  A. PODEL  2,421,963
ANVIL AND PIVOTED JAW OPERATED CAP SEALING MACHINE
Filed June 6, 1942  5 Sheets-Sheet 4

INVENTOR
Abraham Podel.
BY
ATTORNEYS

June 10, 1947.  A. PODEL  2,421,963
ANVIL AND PIVOTED JAW OPERATED CAP SEALING MACHINE
Filed June 6, 1942  5 Sheets-Sheet 5

INVENTOR
Abraham Podel.
BY
ATTORNEYS

Patented June 10, 1947

2,421,963

UNITED STATES PATENT OFFICE 2,421,963

ANVIL AND PIVOTED JAW OPERATED CAP SEALING MACHINE

Abraham Podel, Connellsville, Pa., assignor to Anchor Hocking Glass Corporation, Lancaster, Ohio, a corporation of Delaware Application June 6, 1942, Serial No. 446,025

1 Claim. (Cl. 226—80)

My invention relates to a sealing machine. It has to do, more particularly, with a machine for sealing closure caps to containers.

At the present time, a very popular sealed package adopted for various products comprises a glass container and a closure cap having a skirt adapted to be telescoped over the side wall of the container. This skirt has a bead formed therein in which a gasket is disposed. The cap is sealed on the glass container by reforming the bead which squeezes the gasket against the container. A sealed package of this general type is illustrated in the patent to Scofield, No. 1,611,955, of December 28, 1926. Closure caps of the type indicated are usually sealed on the containers by an anvil member which engages the top of the cap and by segmental jaws which extend inwardly beneath the bead and which are adapted to press or force the bead against the anvil to compress the gasket.

One of the objects of my invention is to provide a sealing machine of the general type indicated which will more efficiently and more effectively seal containers of the type indicated than the prior art machines.

Another object of my invention is to provide a sealing machine of the type indicated including a plurality of chuck units which reform the caps and seal them to the containers.

Another object of my invention is to provide a sealing machine of the type indicated wherein the chuck units are simple and have few parts subject to wear which results in more accurate sealing.

Another object of my invention is to provide a machine of the type indicated having sealing chuck units which are self-contained and which can be removed easily for cleaning and repairs or for replacement by units for different size caps.

In its preferred form, my invention comprises a sealing chuck unit for a machine of the general type indicated which will effectively reform the caps and seal them on the containers. The chuck unit is self-contained and includes a cylindrical housing having its lower end open with a sealing ring associated with such lower end. Supported centrally within the housing is an anvil member which is provided with a centering socket in its lower end for receiving a cap and a normally extending spring-pressed plunger for engaging the cap. A set of sealing jaws are pivotally supported by an inner ring which is disposed within the housing and which is removably carried by an outer ring also disposed within the housing but supported independently thereof. Upon vertical movement of the housing, the sealing ring will engage said jaws, which are normally forced outwardly by springs, and force them to swing inwardly into engagement with the flange of the cap to reform it into sealing relationship with the container. The anvil also moves vertically with the housing and holds the cap in proper association with the container.

The preferred embodiment of my invention is illustrated in the accompanying drawings wherein similar characters of reference designate corresponding parts and wherein.

Figure 1:
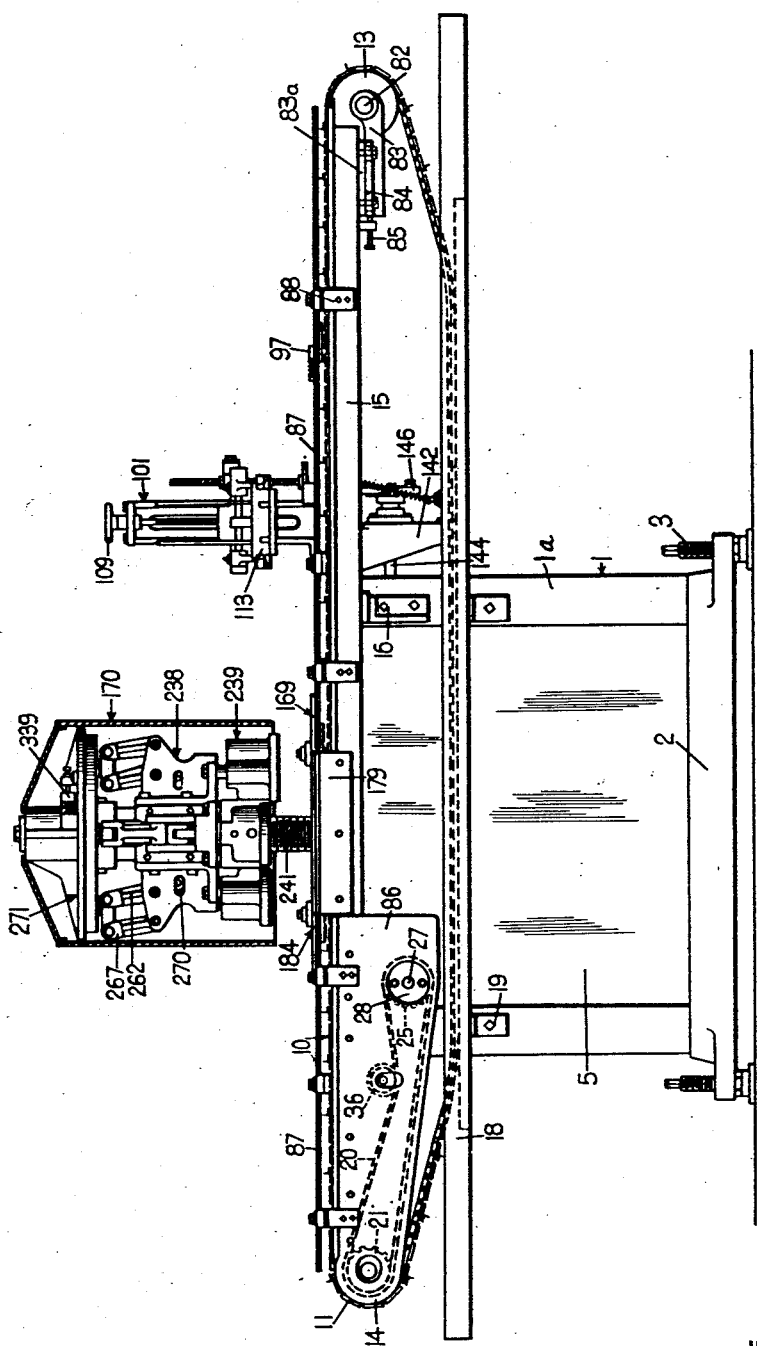
Figure 1 is a side elevational view, partly broken away, of a sealing machine with which my sealing chuck unit may be employed.

With reference to the drawings, I have illustrated a machine with which my sealing chuck unit may be employed as comprising a base portion 1 of substantially rectangular cross section, as shown best in Figure 1. The base plate 2 of this base portion 1 is carried by leveling screws or jacks 3 disposed at each corner thereof. The base portion 1 is provided with four legs 1a and with vertical walls 5 which are removable. Thus, a complete housing is formed for the main driving mechanism and other parts of the machine.

At one edge of the base portion 1, which I will term the front edge, a conveyer unit is disposed adjacent the top thereof, and comprises an endless chain belt 10 which is composed of a plurality of plates 11 which are connected to each other by means of hinge portions. At longitudinally spaced intervals, this conveyer belt 10 carries transversely extending upstanding container engaging cleats. The belt 10 is supported by an idler sprocket 13 (Figure 1) and by a driven sprocket 14. The sprockets 13 and 14 are rotatably carried on the opposite outer ends of supporting beams 15. Brackets 16 are secured to the front legs 1a of the base portion and support the adjacent beams 15. Thus, the upper flight of the belt 10 is carried by the members 15. The lower flight of the belt is adapted to extend through a trough structure 18. This trough structure is supported by brackets 19 which are secured to the front legs 1a of the base portion 1 (Figure 1).

The sprocket 14 is driven my means of an endless chain 20 (Figure 1), which passes around a sprocket 21. As previously indicated, the sprocket 14 drives the belt 10. The chain 20 is driven by a sprocket portion 25 which is carried by a member 28 keyed to shaft 27.

As shown in Figure 1, the idler sprocket 13 which supports the belt 10 is keyed on a shaft 82 which is rotatably mounted on a bearing support 83. The support 83 is supported on the beams 15 by means of a block 83a which is welded to beams 15. Member 83 is mounted for longitudinal movement on member 83a by bolt and slot connections 84. The member 83 may be adjusted longitudinally by means of a screw 85. Adjustment of the sprocket 13 in this manner will adjust the tension of the belt 10.

A guard plate 86 is provided adjacent the drive chain 20 for the conveyer. This plate is secured to the outer member 15.

The upper flight of the conveyer belt 10 has longitudinally extending guide rails 87 associated therewith. These rails are disposed adjacent the opposite edges of the conveyer belt. The guide rails 87 are supported by a plurality of longitudinally spaced brackets 88 which are secured to the members 15.

The cleats on the conveyer belt 10 are provided for positioning the containers in regular longitudinally spaced relationship on the conveyer. In order to cause each cleat to engage the container associated therewith, I provide the unit 97 which is not shown in detail.

After the containers pass the unit 97, they are conveyed to a cap-feeding and applying unit 101 which includes a cap magazine 113 that is vertically adjustable by means including the hand wheel 109.

The cap magazine and cap-feeding mechanism is the same as that disclosed in the co-pending application of Harry E. Stover, Serial No. 427,966, filed January 23, 1942, now Patent No. 2,355,479, dated August 8, 1944. The cap unit 101 is actuated by means including the cam 146 rotatably supported on bracket 142.

As previously indicated, the machine is adapted to seal containers with caps which are of such a type that the skirt thereof must be reformed in order to squeeze the gasket, contained within the skirt, against the wall of the glass container. For example, as shown best in Figures 5 to 8, inclusive, the cap may comprise a disk-like portion 164 having a skirt 165 adapted to telescope over the upper end of the container 166. This skirt is provided with a beaded portion 167 adjacent its lower edge which receives a compressible gasket 168. The beaded portion is adapted to be reformed, in the manner indicated in Figure 8, to bring the gasket 168 into firm contact with the outer surface of the container 166. However, it is to be understood that my invention is not limited to the sealing of this particular type of cap on a container.

The containers, with the caps loosely applied thereto by the cap feeding and applying unit, are next moved into association with an in-feed star wheel 169 (Figure 1) which serves to remove the containers from the conveyer and feed them to a turret-type sealing unit 170. The unit 170 is located laterally of the straight-line conveyer belt 10 in almost tangential relationship thereto. The star wheel 169 is located between the conveyer unit and the sealing unit 170 and has a guide plate associated therewith.

The star wheel 169 is disposed, as previously indicated, in substantially tangential relationship to the conveyer belt 10 and to the sealing unit 170. A second out-feed star wheel 184 is disposed in similar relationship to the conveyer and sealing units at a point on the opposite side of the sealing unit 170.

Figure 2:
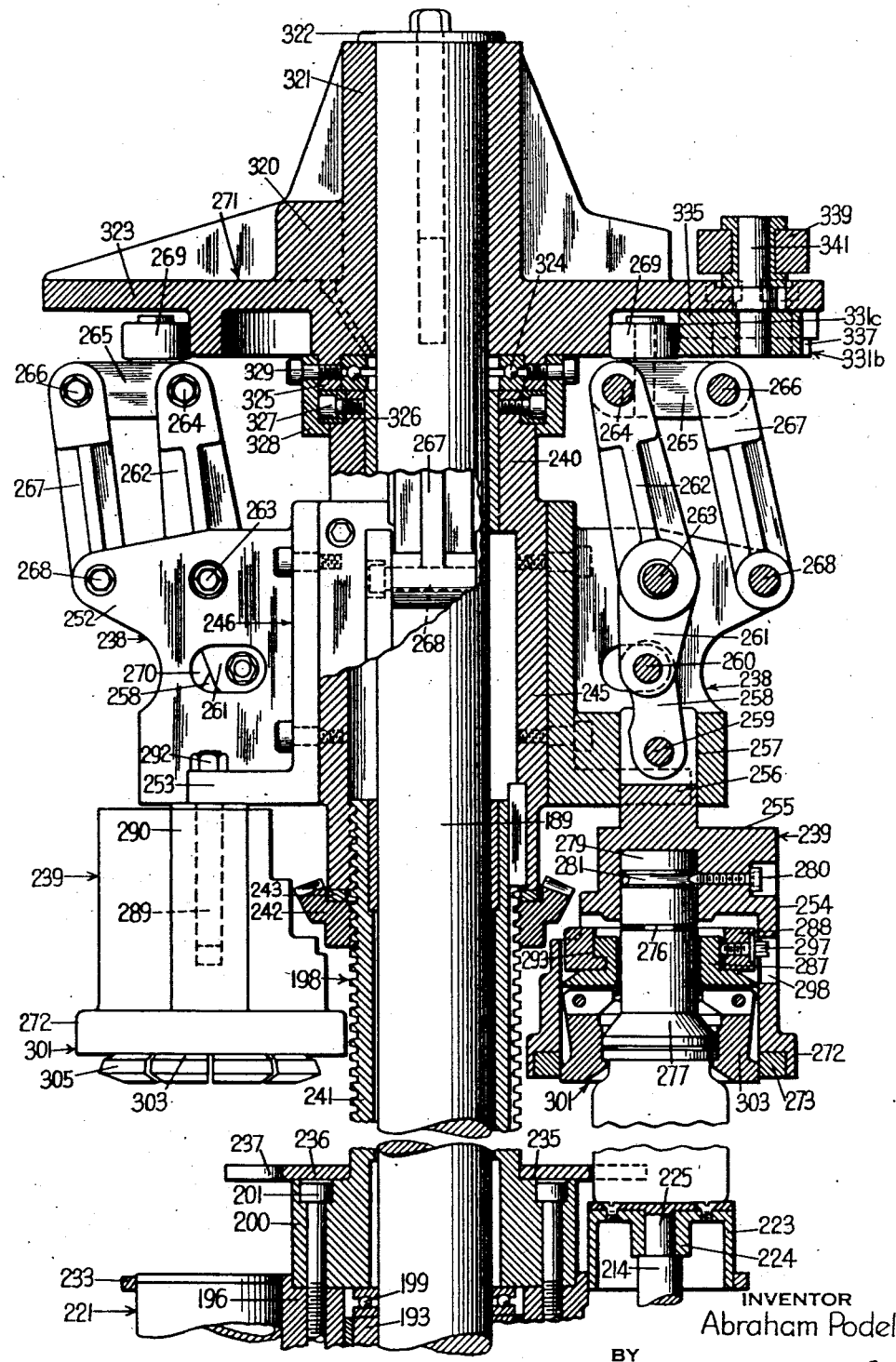
Figure 2 is a detail, partly in elevation and partly in vertical section, of the central portion of the machine and illustrating particularly the sealing chuck units.
Figure 4:
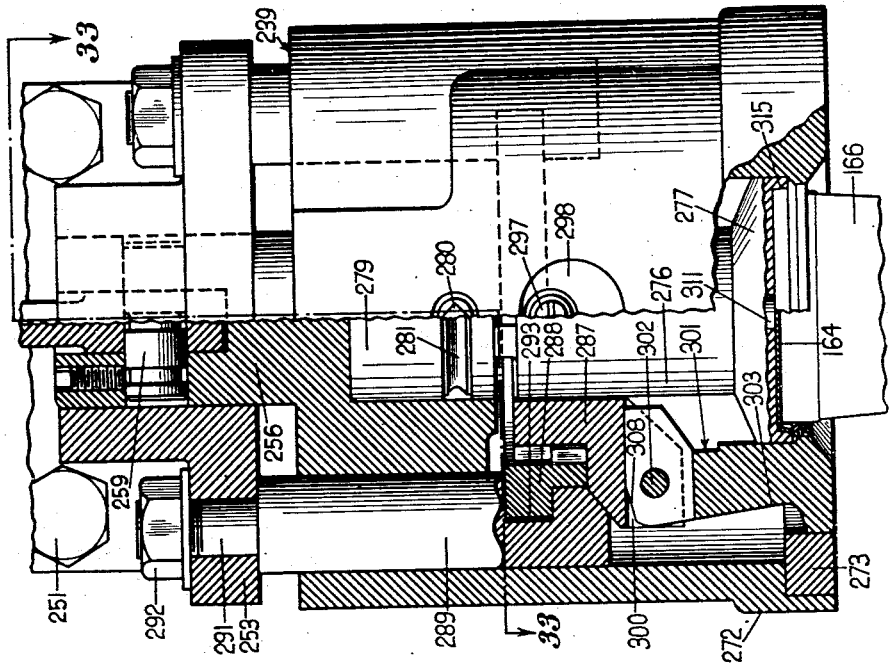
Figure 4 is a similar view but showing the jaws of the chuck closed.

The sealing unit 170, as previously indicated, is of the rotary turret type. It is carried by a stationary column 189 (Figure 2). This column 189 has its lower end supported by the base plate 2. A sleeve-like bearing portion closely surrounds column 189. In surrounding relationship to this bearing portion 193, an article-supporting unit is provided. This unit comprises a casting 196 which is provided with a sleeve-like central portion. This casting 196 is mounted on bearing portion 193 for rotation. Above the casting 196 in surrounding relationship to the column 189, is an upstanding sleeve 198. This sleeve has its lower end resting on a thrust bearing 199 which is supported on the upper edge of a standard. The lower end of sleeve 198 is provided with a hub portion 200 which is bolted, by means of bolts 201, to the casting 196. The sleeve 198 is free to rotate on column 189. Furthermore, member 196 is free to rotate relative to the column. Members 196 and 198 will rotate together because they are connected by the bolts 201. It will be apparent that thrust bearing 199 not only supports sleeve 198 but also supports member 196. A suitable drive (not shown) is provided for rotating casting 196.

The member 196 is provided with four sockets which are vertically disposed at circumferentially spaced intervals. Each of these sockets is adapted to receive an article-supporting table unit 221.

Each article supporting table unit 221 includes a plunger which carries an article-receiving table. This table has a disk-like upper portion having an annular peripheral flange 223 and a centrally disposed depending socket portion 224. The socket portion 224 receives the reduced upper end 225 of plunger 214. Vertical movement of the article supporting units 221 is produced by suitable cam mechanism (not shown).

Rotation of the star wheels 169 and 184 is so timed relative to the movement of the conveyer belt 10 and the sealing unit 170, that the containers will be transported from the conveyer belt 10 to the unit 170 by star wheel 169 and will be removed, after sealing, by star wheel 184 and be again positioned on the conveyer belt. The star wheel 169 will serve to move the containers onto the article receiving units 221 which will be moved successively to the proper level to receive the articles. Carried by member 200 is a disk 236 which rests on the surface 235 of member 200 and is provided with a number of container receiving notches 237 corresponding in number to that of the units 221.

Figure 9:
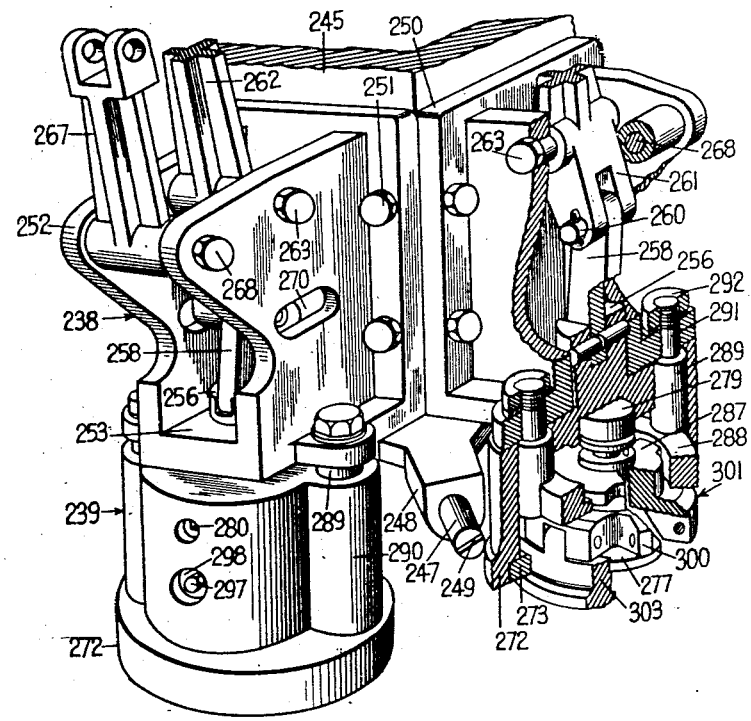
Figure 9 is a perspective view, partly broken away, of two of the sealing chuck units.

Mounted on the upper end of the column 189, is a head 238 which is adapted to rotate thereon. This head supports a plurality of circumferentially spaced sealing chuck units 239 as shown best in Figures 1, 2 and 9. In the drawings four of these units 239 are shown. Each unit 239 is in axial alignment with one of the article-supporting units 221. However, it is to be understood that I may provide a different number of units 239 on my machine. If a different number of sealing chuck units are provided, it is apparent that a similar number of article-supporting units will be provided.

As illustrated best in Figure 2, the head 238 includes a supporting sleeve 240 which surrounds the upper end of sleeve 198 and is splined thereto. The sleeve 198 is threaded as indicated by the number 241. On this threaded sleeve a bevel gear 242 is mounted and this gear is internally threaded for cooperation with the threaded sleeve. The lower end of the supporting sleeve 240 rests on a bushing 243 which is supported on gear 242. The gear 242 is adapted to be rotated by means of a pinion (not shown). When the gear 242 is rotated, it feeds axially of the threaded sleeve 198, the direction of the axial movement depending upon the direction of rotation of the gear. This axial movement of the gear will raise or lower the sleeve 240 which will not rotate on column 189 but which will slide axially thereof due to its splined connection.

The upper and lower portions of the sleeve member 240 are of circular cross section. However, the intermediate portion 245 thereof is of substantially square cross section. To each flat surface of this portion 245, a bracket 246 is secured.

Each of the brackets 246 (Figures 2 and 9) is provided with an inner vertical portion 250 which is bolted by bolts 251 to the flat outer surface of portion 245 of member 240. Each bracket is provided with a pair of spaced radially extending ears 252. A horizontal portion 253 is formed integral with the lower edge of vertical portion 250 and with the lower edges of ears 252.

Each of the units 239, as shown best in Figures 2, 3, 4 and 9, comprises a cylindrical housing portion 254. This housing portion 254 has a closed flat top 255 and an open lower end. The flat top 255 is provided with a centrally disposed upwardly projecting cylindrical boss 256. This boss 256 is mounted for vertical movement in an opening 257 formed in the horizontal portion 253 of the bracket 246. The boss 256 is bifurcated and receives the lower end of a link 258 which is pivoted thereto by a transverse pin 259. The upper end of the link 258 is pivotally connected by a pin 260 to the bifurcated lower portion 261 of a bell crank lever 262. This lever is pivoted between the ears 252 by means of a transverse pin 263. The upper end of the lever 262 is pivotally connected by a transverse pin 264 to a horizontal link 265. The opposite end of this link 265 is pivotally connected by a pin 266 to the upper end of a link 267. The lower end of this link 267 is connected by a pin 268 to a portion of the ears 252. It will be noted that the pins 264 and 266 and the pins 263 and 268 are in horizontal alignment with each other. It will also be noted that the link 267 is parallel to the upper portion of the lever 262. Consequently, regardless of the positions of lever 262 and link 267, the link 265 will be in horizontal position. This will always keep the roller 269, carried by link 265, in horizontal position. It will be noted that in the ears 252, adjacent the ends of pin 260, slots 270 are provided to permit access thereto in order to remove the pin to permit link 258 to be disconnected from lever 261.

The roller 269 is always maintained in horizontal position so that it will properly cooperate with a cam structure illustrated generally by the numeral 271, to be described in detail hereinafter. This cam structure will produce horizontal movement of the roller 269 during rotation of member 240 which carries the sealing chucks 239. This, in turn, will produce an upward pull or a downward push on the upper end of link 258, since the lever 262 will be swung about the pivot point 263. Consequently, this will move the housing 254 of unit 239 up or down relative to bracket 246.

Disposed within an enlarged shouldered portion 272 at the extreme lower end of housing 254 is a sealing ring 273, as shown best in Figures 2, 3 to 7 and 9. The lower surface of this ring is substantially flush with the lower edge of housing 254. This sealing ring is secured in position by means of bolts 274 (Figure 3) threaded upwardly into the housing portion 254. The inner lower edge of ring 273 is chamfered as indicated by the numeral 275. An anvil-supporting member 276 which is of cylindrical form is disposed centrally within the housing 254. This member 276 has an integral sealing anvil 277 of disk-like form on its lower end. The upper end of this member 276 is provided with a reduced hollow stem 278 which is threaded into a collar 279 disposed within the head or top 255 of housing 254. The member 279 is held in position within portion 255 by means of a screw 280 threaded through this portion and having its inner end extending into an annular groove 281 formed in member 279 adjacent its lower edge. The vertical position of the anvil member 277, relative to the sealing ring 273 and sealing jaws 301, may be adjusted by threading the stem 278 into or out of the collar 279. The collar will be prevented from rotating by the screw 280 when it is sufficiently tightened. Relative rotation between members 278 and 279 is normally prevented by means of pins 282 and 283, carried by member 276. These pins are diametrically opposed and cooperate with a series of diametrically opposed pairs of openings 284 formed in the lower edge of collar 279. Pin 283 is normally forced upwardly by a spring 285, disposed in a socket formed in member 276. Pin 282 is normally forced upwardly by means of a screw member 286, disposed in the lower threaded end of a socket formed in member 276. When it is desired to rotate member 276 relative to collar 279, the screw 286 is threaded out of the socket until the upper end of the pin 282 drops from its cooperating opening 284 in member 279. The member 276 may then be rotated relative to member 279, the pin 283 merely riding into and out of successive openings 284. When the proper adjustment has been made, the pin 283 snaps into one of the openings 284 and will, therefore, align the pin 282 with the opposite opening 284 of a pair of such openings. Then it is merely necessary to feed the screw 286 back into the socket to cause the pin 282 to be raised until it extends into the opening 284. Then the member 276 will be locked in adjusted position and the anvil 277 will be held in its adjusted vertical position relative to sealing ring 273 and sealing jaws 301.

Disposed in surrounding relationship to the member 276 above the anvil 277 is a sealing jaw supporting ring 287. This ring 287 is mounted rigidly and vertical movement of member 276 with relation thereto will be permitted. Disposed in surrounding relationship to the ring 287, is a supporting ring 288 (Figures 3, 4, 9 and 10). The ring 288 is supported within the housing 254 by means of a plurality of vertically disposed bolts 289. These bolts are disposed in tubular portions 290 of the housing. They are provided with reduced portions 291 which pass through the horizontal portion 253 of the cooperating brackets 250. Nuts 292 are threaded on the upper ends of these bolts into engagement with portion 253. The lower end of the bolts 289 are provided with transverse horizontally disposed notches 293. These notches 293 receive the outer edge of the ring 288. Thus, the bolts 289 suspend the ring 288 in position within the housing 254.

Figure 3:
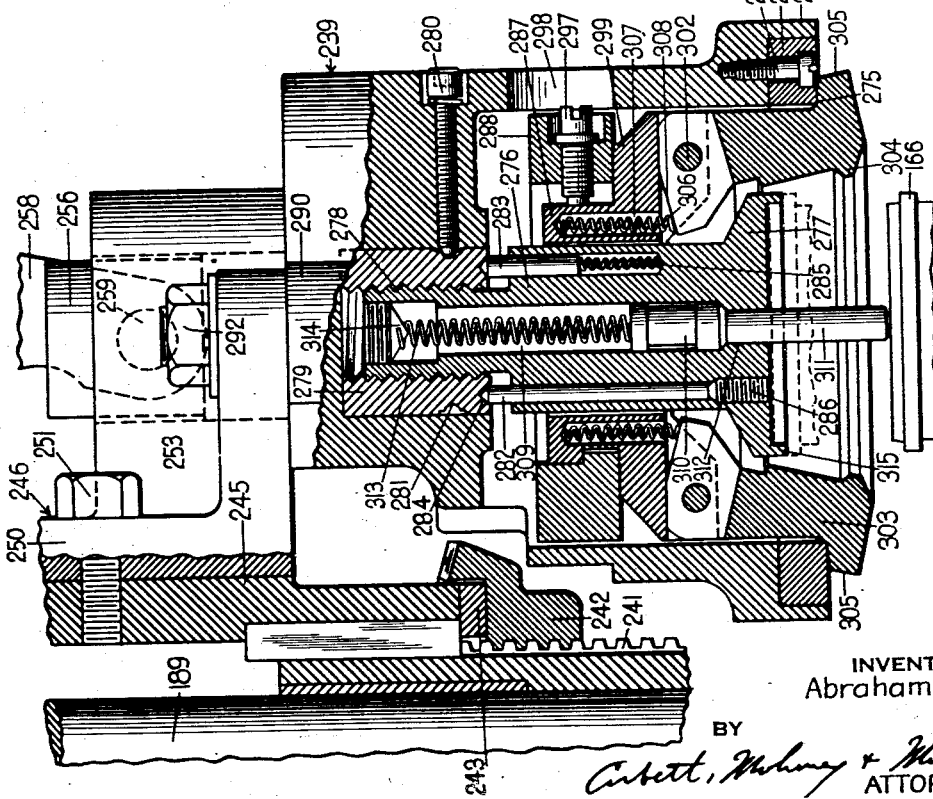
Figure 3 is a view, mainly in vertical section, illustrating one of the sealing chuck units, the jaws of the chuck being open.
Figure 10:
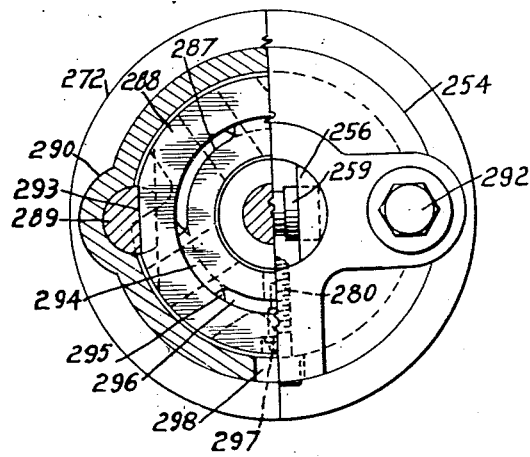
Figure 10 is a view, partly in horizontal section and partly in plan, of one of the sealing chuck units.

The ring 287 is supported within the ring 288 by means of outwardly projecting lugs 294 formed at circumferentially spaced intervals from the periphery of the ring 287. These lugs 294 (Figures 3, 9 and 10) normally rest on a series of similarly spaced inwardly projecting lugs 295 formed on the inner periphery of ring 288. Consequently, the ring 287 may be removed from the ring 288 by rotating ring 287 relative to ring 288 until the lugs 294 are moved into coincidence with the spaces 296 between the lugs 295 on ring 288. Then, the ring 287 can drop out of the ring 288. To normally prevent this relative rotation, I provide the screw 297 (Figures 3 and 10). This screw 297 is threaded through ring 288 and when tightened will engage the outer surface of ring 287. Access to the outer end of screw 297 may be had from a point outside of housing 254 by means of an opening 298 formed in the housing.

The ring 287 is provided with a horizontal outwardly projecting portions 299 formed on its lower edge. Depending from this portion 299 are a series of radially projecting lugs 300. Between each pair of these lugs 300 the upper end of one of the sealing jaw members 301 is disposed. Each sealing jaw member is pivotally connected to a pair of lugs 300 by means of a transversely extending pin 302. The lower sealing portions 303 of the jaws form a complete circle when the jaws are closed. Each jaw is provided with an inner cap skirt engaging shoulder portion 304 projecting inwardly therefrom. Each jaw is provided with an outwardly projecting shoulder portion 305 adapted to be engaged by the sealing ring 273. The lower ends of the jaws are normally swung outwardly into contact with ring 273 by means of compression springs 306 disposed in vertical sockets 307 formed in ring member 287. The lower ends of these springs bear against inwardly projecting portions 308 of jaw members 301. It will be apparent that the upper portions of the jaws and the top surface of sealing anvil 277 are so shaped that they will not interfere with each other.

The sealing anvil supporting member 276 is provided with a centrally disposed socket 309. The lower portion of this socket has the enlarged upper end 310 of a pin 311 disposed therein for vertical movement. This pin 311 extends downwardly through an opening 312 which is formed in the anvil 277. The pin 311 is normally held in its lowermost position, where it extends a considerable distance below anvil 277, by means of a compression spring 313. This spring bears against the upper end of the pin 311. The upper end of this spring is engaged and centered within socket 309 by means of a pointed nut 314 threaded into the upper end of stem 278 of member 276. The anvil 277 is provided with a downwardly extending peripheral cap-engaging flange 315. In the sealing operation, when the container with a cap thereon is lifted into association with the sealing chuck, the cap will be engaged by the pin 311 which will serve to hold it in position on the container during movement into sealing position and to force the cap and container out of the chuck after sealing to prevent sticking in the chuck.

It will be apparent that the entire sealing chuck unit may be removed by removing nuts 292 and the pin 260 which connects link 258 to lever 261. The anvil-supporting member 276 may be removed from the chuck unit by loosening screw 280. The jaw-supporting ring 287 may be removed by loosening screw 297 and rotating the ring relative to ring 288, as previously described. These members, and the members which they carry, may be replaced with different size members for sealing different size caps.

Figure 5:
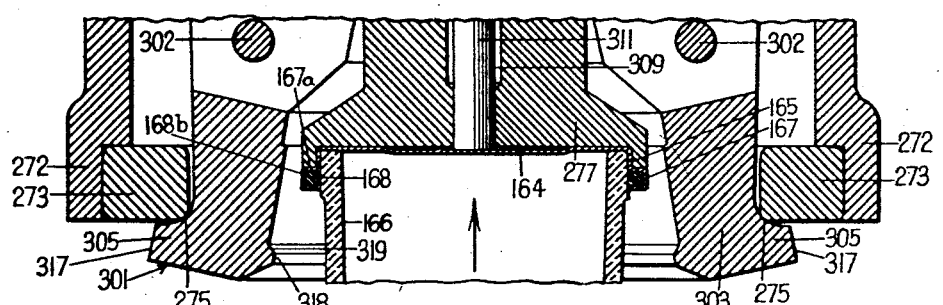
Figure 5 is a detail, in vertical section, of the lower portion of the chuck showing the container with a cap thereon in sealing position but before the jaws start to close.
Figure 6:
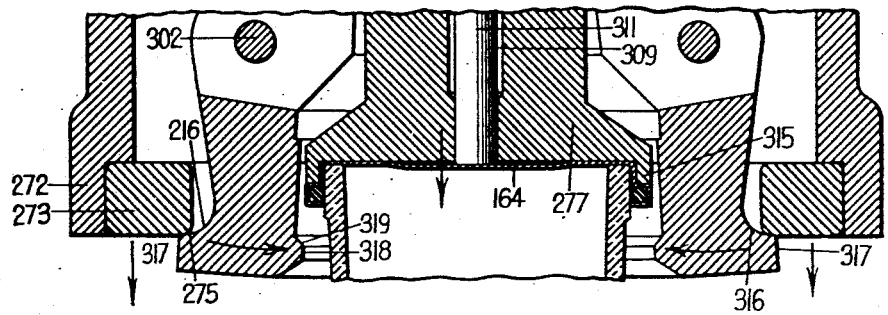
Figure 6 is a similar view showing the jaws starting to close.
Figure 7:
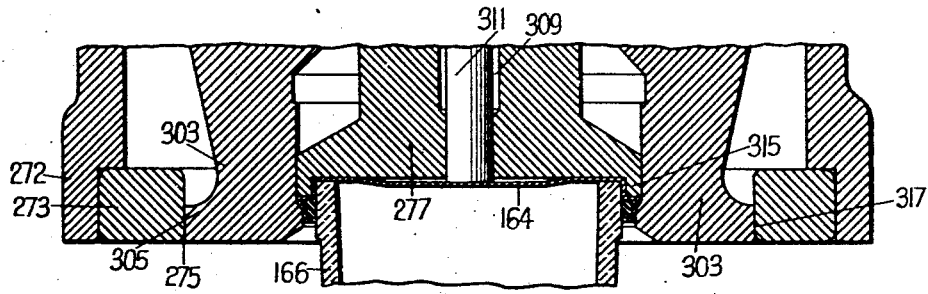
Figure 7 is a similar view showing the jaws in closed position as they reform the bead in the skirt of the cap.
Figure 8:
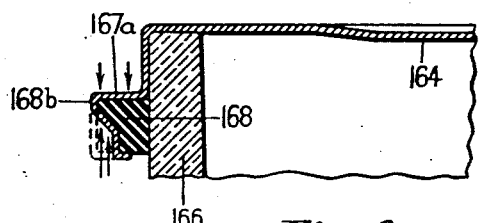
Figure 8 is a view, in vertical section, of a container with a cap sealed thereon by my machine.

The operation of the sealing chuck unit is illustrated best in Figures 5 to 7. The container with the cap thereon is first lifted into association with the sealing chuck unit by vertical movement of the container-supporting unit 221 previously described. The anvil 277 and ring 273 will be in their uppermost positions. As previously indicated, the lower end of pin 311 will engage the cap as the container is moved into sealing position and will prevent accidental displacement of the cap before sealing position within the chuck is reached. Eventually the container will be lifted to the position indicated in Figure 5, where the flange 315 of the anvil 277 surrounds the upper portion of the skirt of the cap and its lower edge engages the horizontal upper portion 167a of the bead of the cap. The sealing jaws 301 will be in their outermost expanded condition, as illustrated in Figure 5. The housing 254 and the sealing ring 273 carried thereby will then be moved downwardly, as indicated in Figure 6. During this movement, the jaw-supporting ring 287 and the jaws 301 carried thereby will remain in a fixed horizontal position. Downward movement of the housing 254 will be produced by lever 261 acting to move the boss 256 downwardly through opening 257 in the horizontal portion 253 of bracket 246. Bolts 289 secured to horizontal portion 253 of the bracket serve to keep the ring 288 and ring 287 in a fixed horizontal position. As the sealing ring 273 moves downwardly, it engages the outwardly projecting portions 305 of the jaws 301 and contracts the jaws or forces them inwardly, as indicated in Figure 6. At the same time that the ring 273 is moved downwardly, the anvil 277 is also moved. As previously indicated, the anvil 277 and the ring 273 are relatively adjusted to the proper vertical position and maintained in such position since the anvil 277 and the ring 273 are both supported from the housing 254. This adjustment of anvil 277 will also adjust it relative to the sealing jaws 301 so as to vary the pressure exerted by the anvil and the sealing jaws on the cap.

In the initial downward movement of ring 273, its inner chamfered corner 275 engages the cam-like upper surface 316 of the portion 305 on the sealing jaws, but upon further downward movement the inner surface of ring 273 will engage the outer vertical surface 317 thereof, as shown best in Figure 7. The shoulder 304 on the inner surface of each sealing jaw is provided with a vertical surface 318 and an upper beveled surface 319. These surfaces engaging the portion 167b of the bead of the cap, after the jaws are closed and the anvil brings the cap down to meet the jaws, will reform it, in the manner indicated in Figures 7 and 8, and will firmly press the gasket 168 against the outer surface of the container 166. The anvil flange 315 presses the cap against the closed jaw shoulders 304 during the reforming operation.

It will be noted that the initial downward movement of housing 254 and sealing ring 273, closes the jaws 301 of the chuck to form a perfect circle and moves the anvil 277 down to sealing position. As the downward movement of the housing 254 continues, it completes the sealing, since the anvil will continue to move downwardly relative to the sealing chuck jaws. However, this further downward movement of the housing 254 and anvil 277 does not change the position or relation of the jaws to the container, since the sealing ring 273 will merely ride along the vertical surfaces 317 of the lower ends of the sealing jaws. Thus, the sealing chucks and the anvil will cooperate to seal the cap on the container.

The cam means 271 for imparting the necessary movements to the levers 261 to operate the sealing chuck units 239 is shown best in Figure 2. The cam structure comprises a supporting casting 320 provided with a sleeve-like portion 321 disposed in surrounding relationship to the upper end of column 189 and splined thereon so that it will be stationary with column 189. However, it can move vertically with member 240 when such member is adjusted vertically. The uppermost position of member 320 on column 189 is limited by means of a cap 322 bolted to the upper end of the column. The member 320 is provided with a disk-like horizontal portion 323. This portion 323 rests on a thrust bearing 324 disposed on the upper end of the member 240. The portion 323 is provided with a depending flange 325 which surrounds the bearing 324. A centering ring 326 is bolted, by bolts 327, to the upper reduced edge of member 240. A cooperating ring 328 is bolted, by means of bolts 329, to the depending flange 325 of member 323. Thus, the member 320 and the member 240 will be connected by a bearing structure which holds these members in proper relationship and which permits relative rotation.

On the lower surface of member 323 a cam 330 is provided in surrounding relationship to column 189 and has a vertical cam portion with which the rollers 269 engage. It will be apparent that downward pull exerted by the housing 254, and associated parts of each sealing chuck unit 239, tends to swing the upper end of lever 262 inwardly.

As the units 239 revolve in a counterclockwise direction about column 189 and relative to member 320, the rollers 269 thereof are in engagement with the cam. Initially each roller is at its outermost position relative to the axis of column 189 to insure that the housing 254 will be in its uppermost position and, therefore, the jaws 301 will be in expanded condition ready to receive the upper end of the container and its cap. As the rollers continue to move relative to the cam, each roller is successively moved radially inwardly closer to the axis of column 189. This will swing the upper end of lever 262 inwardly, lowering the housing 254 and contracting the sealing chuck jaws 301 around the container cap, as previously indicated.

If the diameter of the containers being sealed varies, there is a danger of the chucks 301 exerting too much force thereon and crushing the upper end of the container inwardly. To prevent this, I provide a safety feature which prevents excessive pressure being exerted by the sealing jaws during the sealing period. This safety feature comprises a movable cam section 331b provided in the cam. It is mounted for radial movement in a guideway formed beneath the portion 323 of member 320. This guideway receives a reduced portion 335 of member 331b and is formed by the lower surface of member 323, and removable strips 337 which are bolted to member 323. The member 331b is normally forced inwardly yieldingly by the structure illustrated generally by numerals 339 and 341 which need not be described in detail herein. If the sealing jaws 301 tend to exert too much force on the container, the upper end of the lever 262 will tend to swing outwardly due to the fact that the resistance to contraction of the sealing jaws will tend to move the housing 254 upwardly. The cam section 331b will, therefore, yield outwardly. When each roller passes the section 331b, the section 331b will be moved back to its original position. As the rollers 269 continue to move along the cam, the rollers will again be moved outwardly farther away from the axis of the column 189. This will cause the housing 254 of each unit 239 to be drawn upwardly, thereby allowing the jaws 301 to expand and release the container. If the capped container tends to stick in the chuck, the pin 311 will force it downwardly therefrom.

As indicated best in Figure 1, all of the units supported on the upper end of column 189 are enclosed in a housing 347 which will protect these parts. This housing is removable and is slipped down over these parts, the upper end merely resting on the upper end of the column.

It will be apparent that I have provided a plurality of chuck units which reform the caps and seal them onto the containers. These chuck units are simple and have few parts subject to wear which results in more accurate sealing. The sealing chuck units are self-contained and can be removed easily for cleaning and repairs or to be replaced by units for different size caps.

Various other advantages will be apparent from the preceding description, the drawings and the following claim.

Having thus described my invention, what I claim is:

In closure sealing apparatus, a sealing chuck unit, said sealing chuck unit comprising a cylindrical housing having a closed upper end and an open lower end, an upstanding boss on the closed upper end by means of which the housing may be moved vertically, a fixed bracket in which said boss is mounted for vertical movement, a sealing ring removably mounted at the lower edge of said housing, an anvil member supported centrally within said housing, said anvil member having a closure-engaging disk-like lower end which has a centrally-disposed socket for receiving the closure, said anvil member also including an upstanding cylindrical stem, a centrally disposed socket formed in the upper end of said housing, a threaded collar disposed in said socket, means for maintaining said collar in said socket, said stem having a threaded upper end which fits into the threaded interior of said collar so as to provide vertical adjustment of said anvil relative to said housing, means for normally maintaining said stem in selected adjusted angular positions to which it has been rotated relative to said collar, said means comprising a pair of diametrically opposed vertical pins carried by said stem and adapted to engage a series of pairs of sockets formed in the lower edge of said collar, one of said pins being urged upwardly constantly by a spring into contact with the lower edge of said collar and the other being manually adjustable vertically into and out of engagement with said collar, an outer supporting ring disposed within said housing at a point spaced above the lower edge thereof, means for suspending said ring in fixed vertical position to permit relative vertical movement of the housing, said means comprising members extending through the housing and supported by said bracket, an inner sealing jaw carrying ring disposed within said outer ring, said outer ring being provided with inwardly projecting lugs and said inner ring being provided with outwardly projecting lugs which are normally superimposed but which can be brought out of alignment by rotation of said inner ring to permit removal of said ring, a member extending through said outer ring into engagement with said inner ring to normally prevent relative rotation, said inner ring having a series of circumferentially spaced pairs of depending lugs, a sealing jaw having its upper end pivoted between each of said pairs of lugs by means of a transverse pin for movement in a vertical plane, said jaws having outwardly extending portions on their lower ends adapted to be engaged by said sealing ring, springs carried by said inner ring engaging inwardly projecting portions formed on the upper ends of said jaws, and a closure engaging plunger disposed centrally within the anvil and being normally projected downwardly from the anvil by means of a spring associated therewith.

ABRAHAM PODEL.

REFERENCES CITED

The following references are of record in the file of this patent:

UNITED STATES PATENTS

| Number | Name | Date |
| --- | --- | --- |
| 2,047,846 | Wright et al. | July 14, 1936 |
| 2,047,406 | Capping | July 14, 1936 |
| 1,958,769 | Rundell | May 15, 1934 |
| 2,035,983 | Roehm | Mar. 31, 1936 |
| 2,074,296 | Mitchell | Mar. 30, 1937 |
| 2,258,185 | Lyon | Oct. 7, 1941 |
| 1,029,681 | Haight | June 18, 1912 |
| 1,393,581 | Sells | Oct. 11, 1921 |
| 1,731,295 | Cornell | Oct. 15, 1929 |
| 1,312,640 | Mallinckrodt | Aug. 12, 1919 |
| 2,154,409 | Podel | Apr. 11, 1939 |
| 1,945,954 | Podel | Feb. 6, 1934 |
| 1,134,065 | Hull | Mar. 30, 1915 |
| 2,355,479 | Stover | Aug. 8, 1944 |
| 874,201 | Hull | Dec. 17, 1907 |

Certificate of Correction

Patent No. 2,421,963. June 10, 1947.

ABRAHAM PODEL

It is hereby certified that errors appear in the printed specification of the above numbered patent requiring correction as follows: Column 1, line 18, for the word "bed" read *bead*; column 4, line 14, after "plate" insert the reference numeral *179*; line 27, after "portion" insert *193*; line 55, after "plunger" insert *214*; column 5, line 39, after the period insert the following sentence *Each of these brackets supports one of the sealing chuck units 239.*; and that the said Letters Patent should be read with these corrections therein that the same may conform to the record of the case in the Patent Office.

Signed and sealed this 23rd day of September, A. D. 1947.

[SEAL]

THOMAS F. MURPHY,
*Assistant Commissioner of Patents.*